US010041677B2

(12) United States Patent
Fitzpatrick et al.

(10) Patent No.: US 10,041,677 B2
(45) Date of Patent: Aug. 7, 2018

(54) COMBUSTION LINER FOR USE IN A COMBUSTOR ASSEMBLY AND METHOD OF MANUFACTURING

(71) Applicant: General Electric Company, Schenectady, NY (US)

(72) Inventors: Erich Robert Fitzpatrick, Florence, KY (US); Michael Alan Stieg, Cincinnati, OH (US); Kimberly Lynne Christman Kenoyer, Liberty Township, OH (US)

(73) Assignee: General Electric Company, Schenectady, NY (US)

( * ) Notice: Subject to any disclaimer, the term of this patent is extended or adjusted under 35 U.S.C. 154(b) by 294 days.

(21) Appl. No.: 14/972,281

(22) Filed: Dec. 17, 2015

(65) Prior Publication Data
US 2017/0176008 A1 Jun. 22, 2017

(51) Int. Cl.
*F23R 3/06* (2006.01)
*F23R 3/00* (2006.01)
*F23R 3/04* (2006.01)

(52) U.S. Cl.
CPC ............... *F23R 3/06* (2013.01); *F23R 3/002* (2013.01); *F23R 3/04* (2013.01); *F05D 2220/32* (2013.01);
(Continued)

(58) Field of Classification Search
CPC .... F23R 3/06; F23R 3/002; F23R 3/04; F23R 2900/03042; F05D 2260/202
See application file for complete search history.

(56) References Cited

U.S. PATENT DOCUMENTS 5,181,379 A * 1/1993 Wakeman ............... F02K 1/822
60/753
5,233,828 A * 8/1993 Napoli .................... F02K 1/822
60/755
(Continued)

FOREIGN PATENT DOCUMENTS

CA 2048726 A1 5/1992
EP 0592161 A1 4/1994
(Continued)

OTHER PUBLICATIONS

Extended European Search Report and Opinion issued in connection with corresponding EP Application No. 6202506.8 dated May 10, 2017.

*Primary Examiner* — Steven Sutherland
(74) *Attorney, Agent, or Firm* — General Electric Company; Pamela Kachur (57) ABSTRACT

A combustion liner for use in a combustor assembly is provided. The combustion liner includes a side wall that defines a combustion chamber having a main flow axis extending therethrough. The combustion chamber channels a flow of combustion gas therethrough along a mixer swirl flow axis oriented obliquely relative to the main flow axis. The combustion liner also includes film cooling holes defined within the side wall. The film cooling holes are configured to discharge a pressurized fluid jet into the combustion chamber, and arranged in at least a first row and a second row positioned a first distance from the first row. The film cooling holes are arranged such that, when mixed with the flow of combustion gas, the pressurized fluid jet discharged from film cooling holes in the first row is directed along a discharge flow axis misaligned from film cooling holes in the second row.

14 Claims, 4 Drawing Sheets

(52) U.S. Cl.
CPC .... *F05D 2240/35* (2013.01); *F05D 2260/202* (2013.01); *F23R 2900/00018* (2013.01); *F23R 2900/03042* (2013.01)

(56) References Cited

U.S. PATENT DOCUMENTS

| | | | |
|---|---|---|---|
| 5,241,827 A * | 9/1993 | Lampes | F01D 5/184 60/754 |
| 5,261,223 A | 11/1993 | Foltz | |
| 5,279,127 A | 1/1994 | Napoli | |
| 5,590,531 A | 1/1997 | Desaulty et al. | |
| 6,408,629 B1 * | 6/2002 | Harris | F23R 3/06 60/754 |
| 6,427,446 B1 | 8/2002 | Kraft et al. | |
| 6,513,331 B1 * | 2/2003 | Brown | F23R 3/06 60/754 |
| 7,216,485 B2 | 5/2007 | Caldwell et al. | |
| 8,677,759 B2 | 3/2014 | Kaleeswaran et al. | |
| 8,794,961 B2 | 8/2014 | Chandler et al. | |
| 2006/0037323 A1 | 2/2006 | Reynolds et al. | |
| 2010/0011773 A1 | 1/2010 | Suleiman et al. | |
| 2011/0023495 A1 | 2/2011 | Bronson et al. | |
| 2014/0260257 A1 | 9/2014 | Rullaud et al. | |
| 2015/0167977 A1 | 6/2015 | Leglaye et al. | |

FOREIGN PATENT DOCUMENTS

| | | |
|---|---|---|
| EP | 1 286 117 A1 | 2/2003 |
| EP | 1363075 B1 | 5/2011 |

* cited by examiner

COMBUSTION LINER FOR USE IN A COMBUSTOR ASSEMBLY AND METHOD OF MANUFACTURING

BACKGROUND

The present disclosure relates generally to turbine engines and, more specifically, to a combustion liner of a combustor assembly that has an improved film cooling hole arrangement.

In a gas turbine engine, air pressurized in a compressor is mixed with fuel in a combustor to generate hot combustion gases. Energy is initially extracted from the gases in a high pressure turbine (HPT) that powers the compressor, and subsequently in a low pressure turbine (LPT) that powers a fan in a turbofan aircraft engine application, or powers an external shaft for marine and/or industrial applications. Generally, engine efficiency increases as the temperature of combustion gases is increased. However, the increased gas temperature increases the operating temperature of various components along the gas flowpath, which in turn increases the need for cooling such components to facilitate extending their useful life.

For example, known combustors include a combustion liner that requires cooling during operation of the gas turbine engine. Known turbine nozzles include hollow vanes which also require cooling. In at least some gas turbine engines, flowpath components exposed to hot combustion gases are cooled using compressor bleed air. For example, at least some known components channel the compressor bleed air through film cooling holes defined within the combustion liner or nozzles. In the combustion liner specifically, the film cooling holes are typically arranged in rows that extend transversely relative to a main flow axis of the gas turbine engine, and film cooling holes in adjacent rows are offset from each other in a staggered configuration. However, the natural swirl of the hot combustion gases channeled through the combustor can result in hot streaks forming along the combustion liner, thereby reducing the service life of the combustor.

BRIEF DESCRIPTION

In one aspect, a combustion liner for use in a combustor assembly is provided. The combustion liner includes a side wall that defines a combustion chamber having a main flow axis extending therethrough. The combustion chamber is configured to channel a flow of combustion gas therethrough along a mixer swirl flow axis oriented obliquely relative to the main flow axis. The combustion liner also includes a plurality of film cooling holes defined within the side wall. The plurality of film cooling holes are configured to discharge a pressurized fluid jet into the combustion chamber, and arranged in at least a first row of film cooling holes and a second row of film cooling holes positioned a first distance from the first row. The plurality of film cooling holes are arranged such that, when mixed with the flow of combustion gas, the pressurized fluid jet discharged from film cooling holes in the first row is directed along a discharge flow axis misaligned from film cooling holes in the second row.

In another aspect, a combustor assembly is provided. The combustor assembly includes a combustion liner including a side wall that defines a combustion chamber having a main flow axis extending therethrough, and a plurality of film cooling holes defined within the side wall. The plurality of film cooling holes are configured to discharge a pressurized fluid jet into the combustion chamber, and the plurality of film cooling holes are arranged in at least a first row of film cooling holes and a second row of film cooling holes positioned a first distance from the first row. The combustor assembly also includes a mixer positioned at an upstream end of the combustion liner. The mixer is configured to channel a flow of combustion gas into the combustion chamber along a mixer swirl flow axis oriented obliquely relative to the main flow axis. The plurality of film cooling holes are arranged such that, when mixed with the flow of combustion gas, the pressurized fluid jet discharged from film cooling holes in the first row is directed along a discharge flow axis misaligned from film cooling holes in the second row.

In yet another aspect, a method of manufacturing a combustion liner for use in a combustor assembly is provided. The method includes defining a plurality of film cooling holes within a side wall of the combustor assembly. The side wall defines a combustion chamber having a main flow axis extending therethrough, and the plurality of film cooling holes are configured to discharge a pressurized fluid jet into the combustion chamber. The combustion chamber is configured to channel a flow of combustion gas therethrough along a mixer swirl flow axis angled obliquely relative to the main flow axis. The method also includes arranging the plurality of film cooling holes in at least a first row of film cooling holes and a second row of film cooling holes positioned a first distance from the first row. The plurality of film cooling holes are arranged such that, when mixed with the flow of combustion gas, the pressurized fluid jet discharged from film cooling holes in the first row is directed along a discharge flow axis misaligned from film cooling holes in the second row.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

Embodiments of the present disclosure relate to a combustor assembly having an arrangement of film cooling holes in an annular side wall thereof that facilitates reducing the formation of hot streaks on the side wall. More specifically, the film cooling holes are arranged in a series of rows, such as a first row, a second row adjacent the first row, and a third row adjacent the second row. Film cooling holes in the first, second, and third rows are offset from each other. For example, the arrangement of film cooling holes in the second and third rows is selected as a function of a direction of mixer swirl flow of combustion gases channeled through the combustor assembly and, more specifically, as a function of a direction of discharge of pressurized fluid jets discharged from film cooling holes in the first row. The arrangement is selected such that pressurized fluid jets discharged from film cooling holes in the first row are misaligned from film cooling holes in the second row to facilitate staggering film cooling provided by film cooling holes in the first and second rows in the hoop direction of the annular side wall. Moreover, pressurized fluid jets discharged from film cooling holes in the first row substantially align with film cooling holes in the third row. The third row is separated from the first row by a distance that ensures film cooling provided by film cooling holes in the first and third rows are staggered in the axial direction of the combustor assembly. As such, the formation of hot streaks on the side wall is reduced with film cooling holes arranged in an efficient and space saving manner.

Figure 1:
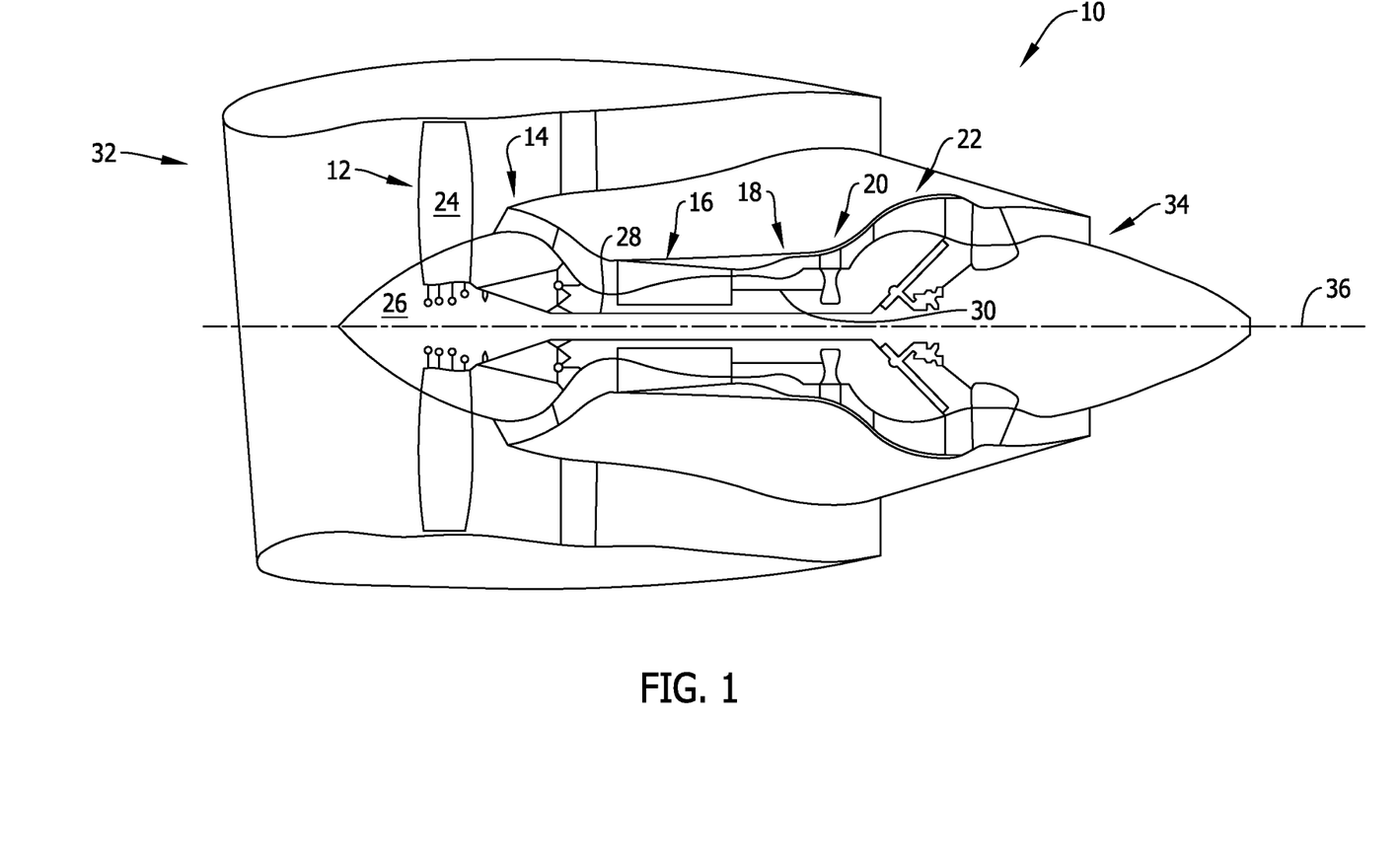
FIG. 1 is a schematic illustration of an exemplary turbofan engine.

FIG. 1 is a schematic illustration of an exemplary turbofan engine 10 including a fan assembly 12, a low pressure or booster compressor 14, a high-pressure compressor 16, and a combustor assembly 18. Fan assembly 12, booster compressor 14, high-pressure compressor 16, and combustor assembly 18 are coupled in flow communication. Turbofan engine 10 also includes a high-pressure turbine 20 coupled in flow communication with combustor assembly 18 and a low-pressure turbine 22. Fan assembly 12 includes an array of fan blades 24 extending radially outward from a rotor disk 26. Low-pressure turbine 22 is coupled to fan assembly 12 and booster compressor 14 through a first drive shaft 28, and high-pressure turbine 20 is coupled to high-pressure compressor 16 through a second drive shaft 30. Turbofan engine 10 has an intake 32 and an exhaust 34. Turbofan engine 10 further includes a centerline 36 about which fan assembly 12, booster compressor 14, high-pressure compressor 16, and turbines 20 and 22 rotate.

In operation, air entering turbofan engine 10 through intake 32 is channeled through fan assembly 12 towards booster compressor 14. Compressed air is discharged from booster compressor 14 towards high-pressure compressor 16. Highly compressed air is channeled from high-pressure compressor 16 towards combustor assembly 18, mixed with fuel, and the mixture is combusted within combustor assembly 18. High temperature combustion gas generated by combustor assembly 18 is channeled towards turbine assemblies 20 and 22. Combustion gas is subsequently discharged from turbofan engine 10 via exhaust 34.

Figure 2:
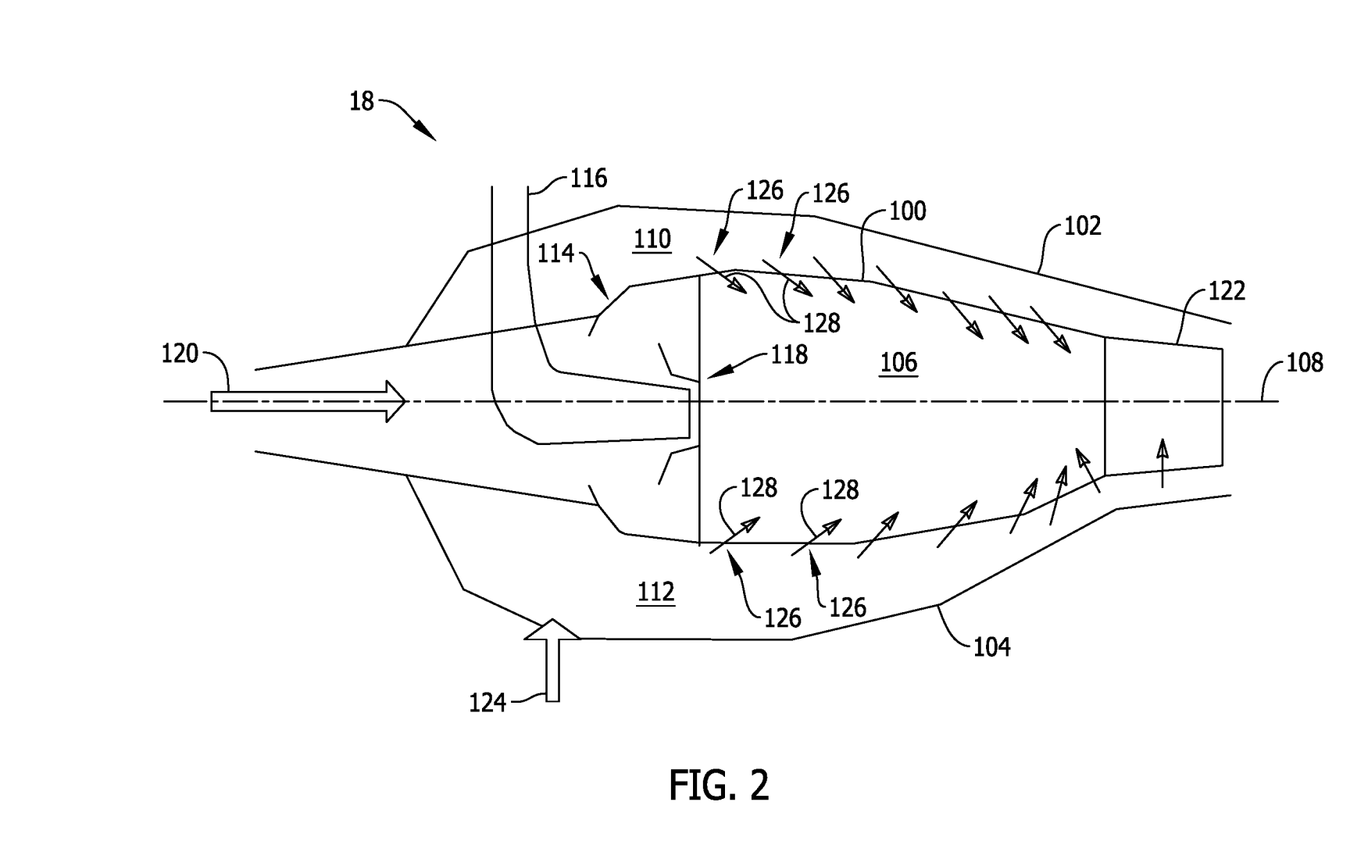
FIG. 2 is a schematic cross-sectional illustration of an exemplary combustor assembly that may be used with the turbofan engine shown in FIG. 1.

FIG. 2 is a schematic cross-sectional illustration of combustor assembly 18 that may be used with turbofan engine 10 (shown in FIG. 1). In the exemplary embodiment, combustor assembly 18 includes a combustion liner 100 positioned between a radially outer casing 102 and a radially inner casing 104. Combustion liner 100 defines a combustion chamber 106, as will be described in more detail below. Moreover, radially outer casing 102 and radially inner casing 104 are positioned about a centerline 108 of combustor assembly 18 such that a radially outer passage 110 is defined between radially outer casing 102 and combustion liner 100, and such that a radially inner passage 112 is defined between radially inner casing 104 and combustion liner 100. An annular dome assembly 114 extends between, and is coupled to, combustion liner 100, and a fuel nozzle 116 extends through radially outer casing 102 to couple to a dome assembly 114. A mixer 118 is positioned at an upstream end of combustion liner 100, and receives fuel from fuel nozzle 116 and receives compressed air 120 channeled from high pressure compressor 16 (shown in FIG. 1). The fuel and air are swirled and mixed together by mixer 118, and the resulting fuel-air mixture is discharged into combustion chamber 106. The fuel-air mixture is combusted and a flow of combustion gas is channeled through combustion chamber 106 and past a nozzle 122 before being channeled towards high pressure turbine 20 (shown in FIG. 1). While shown as an annular-type combustor, it should be understood that cooling may be provided within turbine engines having other combustor architectures including can-annular and dump-type combustors.

In one embodiment, a flow of bleed air 124 is channeled from booster compressor 14 to provide film cooling for hot gas path components. As used herein, "hot gas path" refers to a flow path for combusted gas within turbofan engine 10, and "hot gas path component" refers to any component that contacts the combusted gas within the hot gas path. For example, hot gas path components include at least one of, but not limited to, a combustion liner, a nozzle, a rotor blade, and a shroud. More specifically, in the exemplary embodiment, bleed air 124 is channeled through radially outer casing 102 such that bleed air 124 flows within radially outer passage 110 and radially inner passage 112. Combustion liner 100 includes a plurality of film cooling holes 126 for channeling bleed air 124 therethrough. More specifically, film cooling holes 126 are coupled in flow communication with radially outer and inner passages 110 and 112 such that pressurized fluid jets 128 of bleed air 124 are discharged from film cooling holes 126 into combustion chamber 106, and such that a protective film (not shown) formed from pressurized fluid jets 128 is formed over combustion liner 100. As such, bleed air 124 facilitates protecting combustion liner 100 from combustion gas channeled through combustion chamber 106. As used herein, "protective film" refers to a layer of gas formed over respective components, and formed from the flow of bleed air gas, for example.

Figure 3:
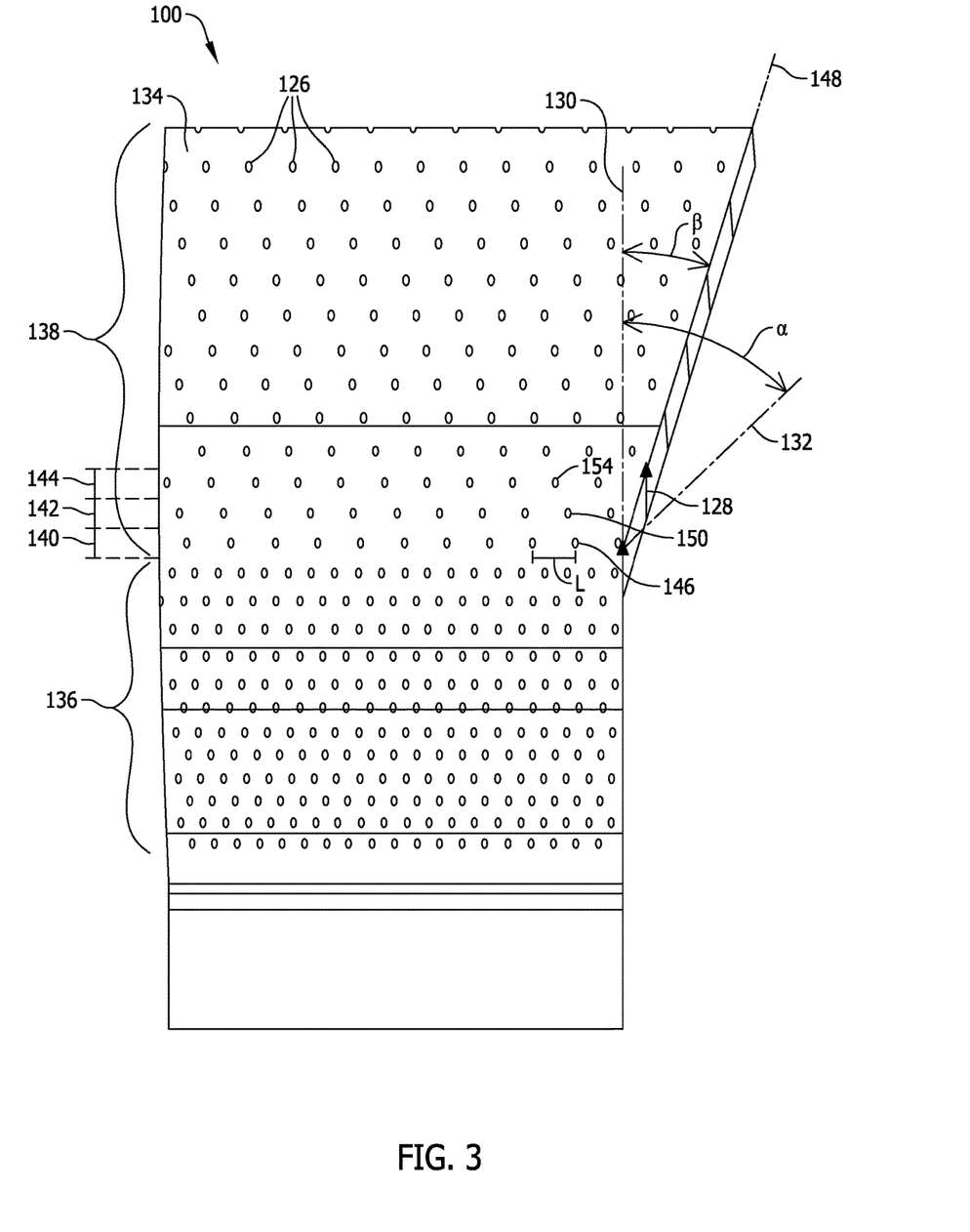
FIG. 3 is a partial cutaway view of a combustion liner that may be used in the combustor assembly shown in FIG. 2.
Figure 4:
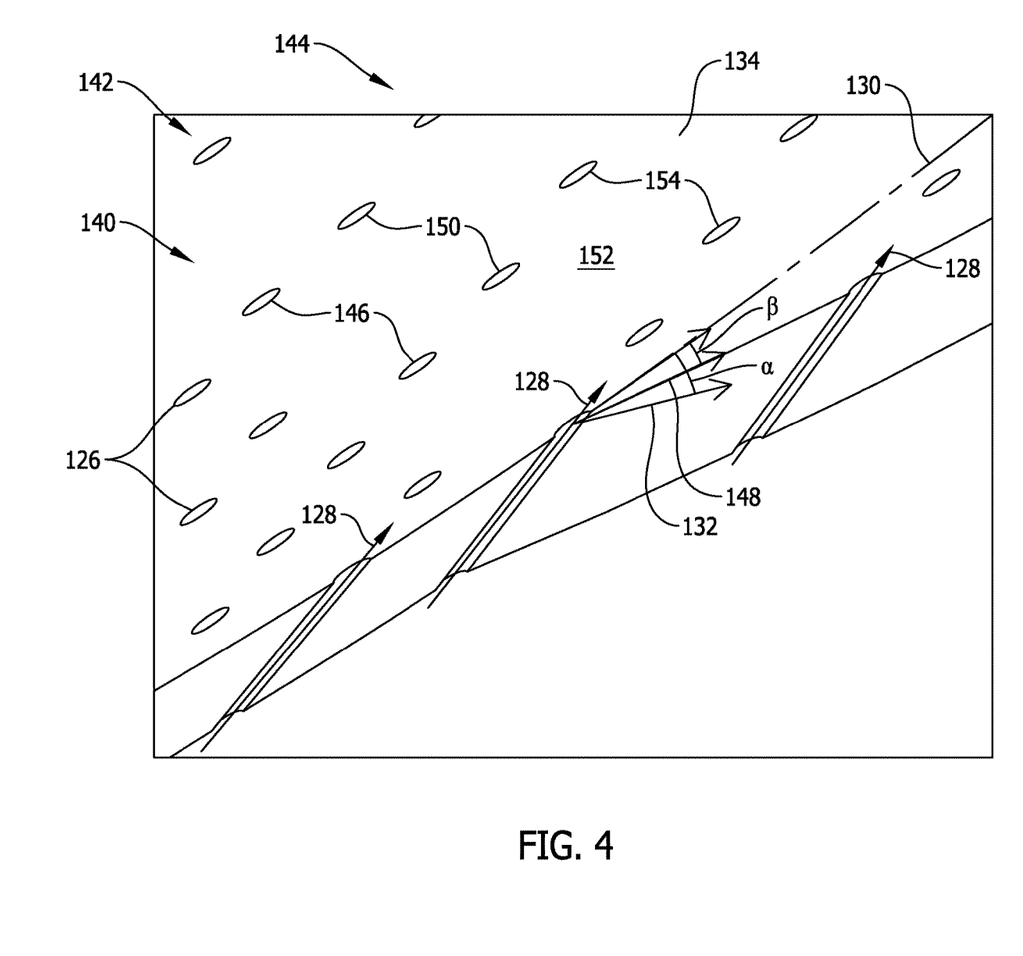
FIG. 4 is an alternative partial cutaway view of the combustion liner shown in FIG. 3.

FIG. 3 is a partial cutaway view of combustion liner 100 that may be used in combustor assembly 18 (shown in FIG. 2), and FIG. 4 is an alternative partial cutaway view of combustion liner 100. In the exemplary embodiment, combustion liner 100 includes an annular side wall 134 that defines combustion chamber 106 (shown in FIG. 2) having a main flow axis 130 extending therethrough. Main flow axis 130 generally corresponds with centerline 108 (shown in FIG. 2) of combustor assembly 18. Moreover, as described above, a fuel-air mixture is discharged into combustion chamber 106, and the fuel-air mixture is combusted and a flow of combustion gas is channeled through combustion chamber 106. More specifically, mixer 118 (shown in FIG. 2) facilitates inducing swirl to the fuel-air mixture such that the resultant flow of combustion gas is channeled through combustion chamber 106 along a mixer swirl flow axis 132 oriented obliquely relative to main flow axis 130.

In the exemplary embodiment, a plurality of film cooling holes 126 are defined within side wall 134 of combustion liner 100. Combustion liner 100 includes a preferential region 136 and a non-preferential region 138. Preferential region 136 includes a more densely packed arrangement of film cooling holes 126 than non-preferential region 138 to provide additional film cooling at the hottest region of combustion liner 100. Film cooling holes 126 in preferential region 136 are arranged in an alternating staggered layout, while film cooling holes 126 in non-preferential region 138 are arranged in a manner that reduces the formation of hot streaks in non-preferential region 138, as will be described in more detail below.

In one embodiment, the plurality of film cooling holes 126 are arranged in a plurality of rows. For example, as shown in FIG. 3, the plurality of film cooling holes 126 are arranged in at least a first row 140 of film cooling holes and a second row 142 of film cooling holes positioned a first distance from first row 140. More specifically, first row 140 and second row 142 are positioned directly adjacent each other and extend transversely relative to main flow axis 130. A third row 144 of film cooling holes is positioned a second distance, greater than the first distance, from first row 140. More specifically, second row 142 and third row 144 are positioned directly adjacent each other and extend transversely relative to main flow axis 130.

In operation, and as described above, each film cooling hole 126 discharges a pressurized fluid jet 128 into combustion chamber 106. In the exemplary embodiment, the plurality of film cooling holes 126 are arranged such that, when mixed with the flow of combustion gas, pressurized fluid jets 128 discharged from film cooling holes 146 in first row 140 are directed along a discharge flow axis 148 misaligned from film cooling holes 150 in second row 142. More specifically, the flow of combustion gas channeled through combustion chamber 106 along mixer swirl flow axis 132 induces pressurized fluid jet 128 to change direction as pressurized fluid jet 128 separates from a surface 152 of combustion liner 100. As such, discharge flow axis 148 is used to determine the layout of the plurality of film cooling holes 126 in non-preferential region defined within side wall 134 to ensure film cooling provided by each pressurized fluid jet 128 in adjacent rows is staggered, which facilitates reducing the formation of hot streaks on side wall 134.

In one embodiment, the plurality of film cooling holes 126 arranged in each of first row 140, second row 142, and third row 144 are spaced an equal distance from each other. Moreover, film cooling holes 150 in second row 142 are offset from film cooling holes 146 in first row 140 relative to main flow axis 130 by less than half a length L of the equal distance. Likewise, film cooling holes 154 in third row 144 are offset from film cooling holes 150 in second row 142 relative to main flow axis 130 by less than half length L of the equal distance. Additionally, film cooling holes 154 in third row 144 are offset from film cooling holes 146 in first row 140 and from film cooling holes 150 in second row relative to main flow axis 130 such that film cooling holes 154 in third row 144 are substantially aligned with discharge flow axis 148. As described above, first row 140 and third row 144 are separated from each other by the second distance. As such, the second distance is selected to ensure pressurized fluid jets 128 discharged from film cooling holes 146 do not combine with pressurized fluid jets 128 discharged from film cooling holes 154, thereby defining a staggered configuration of pressurized fluid jets 128 to facilitate reducing the formation of hot streaks. In an alternative embodiment, the plurality of film cooling holes 126 arranged in each of first row 140, second row 142, and third row 144 are spaced a variable distance from each other.

In the exemplary embodiment, discharge flow axis 148 is oriented obliquely relative to main flow axis 130. An angle β of discharge flow axis relative to main flow axis is determined based on at least one of a velocity of pressurized fluid jets 128 discharged from film cooling holes 126, an angle that film cooling holes 126 extend through side wall 134, and an angle α of mixer swirl flow axis 132 relative to main flow axis 130. For example, film cooling holes 146 in first row 140 discharge pressurized fluid jets 128 at a velocity such that discharge flow axis 148 is angled relative to main flow axis 130 by about half angle α defined between main flow axis 130 and mixer swirl flow axis 132.

While described in the context of first, second, and third rows 140, 142, and 144, it should be understood that the arrangement of film cooling holes in subsequent rows are also arranged in accordance with the principles of film cooling holes arranged in first, second, and third rows 140, 142, and 144.

An exemplary technical effect of the system and methods described herein includes at least one of: (a) reducing the formation of hot streaks in a hot gas path component that uses film cooling; (b) improving film cooling efficiency; and (c) increasing the service life of hot gas path components.

Exemplary embodiments of a turbofan engine and related components are described above in detail. The system is not limited to the specific embodiments described herein, but rather, components of systems and/or steps of the methods may be utilized independently and separately from other components and/or steps described herein. For example, the configuration of components described herein may also be used in combination with other processes, and is not limited to practice with only turbofan engines and related methods as described herein. Rather, the exemplary embodiment can be implemented and utilized in connection with many applications where film cooling hot gas path components is utilized.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A combustion liner for use in a combustor assembly, said combustion liner comprising:
   a side wall that defines a combustion chamber having a main flow axis extending therethrough, wherein said combustion chamber is configured to channel a flow of combustion gas therethrough along a mixer swirl flow axis oriented obliquely relative to the main flow axis;
   a plurality of film cooling holes defined within said side wall, said plurality of film cooling holes configured to discharge a pressurized fluid jet into said combustion chamber, said plurality of film cooling holes arranged in at least a first row of film cooling holes, a second row of film cooling holes positioned a first distance from said first row, and a third row of film cooling holes positioned a second distance, greater than the first distance, from said first row;
   said plurality of film cooling holes arranged such that, when mixed with the flow of combustion gas, the pressurized fluid jet discharged from film cooling holes in said first row is directed along a discharge flow axis misaligned from film cooling holes in said second row and said film cooling holes in said third row are offset from said film cooling holes in said first row relative to the main flow axis such that said film cooling holes in said third row are aligned with the discharge flow axis; and
   wherein said film cooling holes in said first row discharge the pressurized fluid jet at velocity such that the discharge flow axis is angled relative to the main flow axis by half an angle defined between the main flow axis and the mixer swirl flow axis.

2. The combustion liner in accordance with claim 1, wherein said first row and said second row extend transversely relative to the main flow axis.

3. The combustion liner in accordance with claim 1, wherein said plurality of film cooling holes arranged in each of said first row and said second row are spaced an equal distance from each other.

4. The combustion liner in accordance with claim 3, wherein said film cooling holes in said second row are offset from said film cooling holes in said first row relative to the main flow axis by less than half a length of the equal distance.

5. The combustion liner in accordance with claim 1, wherein the discharge flow axis is oriented obliquely relative to the main flow axis.

6. A combustor assembly comprising:
   a combustion liner comprising:
      a side wall that defines a combustion chamber having a main flow axis extending therethrough;
      a plurality of film cooling holes defined within said side wall, said plurality of film cooling holes configured to discharge a pressurized fluid jet into said combustion chamber, said plurality of film cooling holes arranged in at least a first row of film cooling holes, a second row of film cooling holes positioned a first distance from said first row, and a third row of film cooling holes positioned a second distance, greater than the first distance, from said first row, wherein film cooling holes in said third row are offset from said film cooling holes in said first row relative to the main flow axis such that said film cooling holes in said third row are aligned with a discharge flow axis; and
   a mixer positioned at an upstream end of said combustion liner, said mixer configured to channel a flow of combustion gas into said combustion chamber along a mixer swirl flow axis oriented obliquely relative to the main flow axis, wherein said plurality of film cooling holes are arranged such that, when mixed with the flow of combustion gas, the pressurized fluid jet discharged from film cooling holes in said first row is directed along the discharge flow axis misaligned from film cooling holes in said second row and wherein said film cooling holes in said first row discharge the pressurized fluid jet at a velocity such that the discharge flow axis is angled relative to the main flow axis by half an angle defined between the main flow axis and the mixer swirl flow axis.

7. The combustor assembly in accordance with claim 6, wherein said first row and said second row extend transversely relative to the main flow axis.

8. The combustor assembly in accordance with claim 6, wherein said plurality of film cooling holes arranged in each of said first row and said second row are spaced an equal distance from each other.

9. The combustor assembly in accordance with claim 8, wherein said film cooling holes in said second row are offset from said film cooling holes in said first row relative to the main flow axis by less than half a length of the equal distance.

10. The combustor assembly in accordance with claim 6, wherein the discharge flow axis is oriented obliquely relative to the main flow axis.

11. A method of manufacturing a combustion liner for use in a combustor assembly, said method comprising:
   defining a plurality of film cooling holes within a side wall of the combustor assembly, the side wall defining a combustion chamber having a main flow axis extending therethrough, the plurality of film cooling holes configured to discharge a pressurized fluid jet into the combustion chamber, the combustion chamber configured to channel a flow of combustion gas therethrough along a mixer swirl flow axis angled obliquely relative to the main flow axis; and
   arranging the plurality of film cooling holes in at least a first row of film cooling holes, a second row of film cooling holes positioned a first distance from the first row, and a third row of film cooling holes positioned a second distance, greater than the first distance, from the first row, the plurality of film cooling holes arranged such that, when mixed with the flow of combustion gas, the pressurized fluid jet discharged from film cooling holes in the first row is directed along a discharge flow axis misaligned from film cooling holes in the second row, comprising:
   offsetting film cooling holes in the third row from film cooling holes in the first row relative to the main flow axis such that the film cooling holes in the third row are aligned with the discharge flow axis;

wherein offsetting film cooling holes in the third row comprises defining the discharge flow axis as angled obliquely relative to the main flow axis by half an angle defined between the main flow axis and the mixer swirl flow axis.

12. The method in accordance with claim 11, wherein arranging the plurality of film cooling holes comprises extending the first row and the second row transversely relative to the main flow axis.

13. The method in accordance with claim 11, wherein arranging the plurality of film cooling holes comprises arranging the plurality of film cooling holes such that the film cooling holes in each of the first row and the second row are spaced an equal distance from each other.

14. The method in accordance with claim 13, wherein arranging the plurality of film cooling holes comprises offsetting the film cooling holes in the second row from the film cooling holes in the first row relative to the main flow axis by less than half a length of the equal distance.

* * * * *